(12) United States Patent
Kirsanov et al.

(10) Patent No.: US 12,506,600 B2
(45) Date of Patent: Dec. 23, 2025

(54) SYSTEM AND METHOD FOR QUANTUM KEY DISTRIBUTION

(71) Applicant: Terra Quantum AG, St. Gallen (CH)

(72) Inventors: Nikita Kirsanov, St. Gallen (CH); Mikhail Yarovikov, St. Gallen (CH)

(73) Assignee: Terra Quantum AG, St. Gallen (CH)

( * ) Notice: Subject to any disclaimer, the term of this patent is extended or adjusted under 35 U.S.C. 154(b) by 122 days.

(21) Appl. No.: 18/447,822

(22) Filed: Aug. 10, 2023

(65) Prior Publication Data

US 2024/0064010 A1     Feb. 22, 2024

(30) Foreign Application Priority Data

Aug. 17, 2022   (EP) ..................................... 22190770

(51) Int. Cl.
*H04L 9/08*     (2006.01)
*H04B 10/70*    (2013.01)

(52) U.S. Cl.
CPC ........... *H04L 9/0852* (2013.01); *H04B 10/70* (2013.01)

(58) Field of Classification Search
CPC ....... H04L 9/0852; H04B 10/70; H04B 10/25; G02B 6/023; G02B 6/02042
See application file for complete search history.

(56) References Cited

U.S. PATENT DOCUMENTS

| 5,627,934 A | 5/1997 | Muhs | |
| 2002/0172483 A1* | 11/2002 | MacChesney | G02B 6/2852 385/124 |
| 2004/0126072 A1* | 7/2004 | Hoon Lee | G02B 6/122 385/27 |
| 2012/0275750 A1* | 11/2012 | Kozlov | G02B 6/032 264/1.24 |

FOREIGN PATENT DOCUMENTS

| EP | 0105461 A2 | 4/1984 |
| EP | 1256826 A2 | 11/2002 |
| EP | 1256826 A3 | 7/2004 |

OTHER PUBLICATIONS

Kirsanov et al., "Long-distance quantum key distribution based on the physical loss control," arXiv preprint arXiv:2105.00035, 20 pp. (Apr. 30, 2021).

(Continued)

*Primary Examiner* — Baotran N To
(74) *Attorney, Agent, or Firm* — Leydig, Voit & Mayer, Ltd.

(57) ABSTRACT

A system for quantum key distribution includes a first data processing device; a second data processing device; and a transmission line extending between the first data processing device and the second data processing device. The transmission line comprises an inner optical fiber, a shielding layer surrounding the inner optical fiber, and an outer optical fiber surrounding the shielding layer. The first data processing device and the second data processing device are configured to determine a shared key by quantum key distribution via quantum signals along the inner optical fiber. The system is configured to determine outer signal losses along the outer optical fiber.

17 Claims, 5 Drawing Sheets

(56) References Cited

OTHER PUBLICATIONS

Kodukhov et al., "Boosting quantum key distribution via the end-to-end physical control," *arXiv preprint arXiv*:2109.05575, 14 pp. (Sep. 12, 2021).
European Patent Office, Extended European Search Report in European Patent Application No. 22190770.2, 7 pp. (Feb. 1, 2023).
IP Australia, Examination Report No. 2 in Australian Patent Application No. 2023203624, 5 pp. (Aug. 14, 2025).

\* cited by examiner

SYSTEM AND METHOD FOR QUANTUM KEY DISTRIBUTION

CROSS-REFERENCE TO RELATED APPLICATIONS

The instant application claims priority to European Patent Application No. 22190770.2, filed Aug. 17, 2022, which is incorporated herein in its entirety by reference.

FIELD OF THE DISCLOSURE

The present disclosure generally relates to a system for quantum key distribution. Further, a method for quantum key distribution is disclosed.

BACKGROUND OF THE INVENTION

When employing an optical fiber as a quantum information channel for establishing a shared key by quantum key distribution (QKD), there are generally two types of losses that can appear: natural signal losses and local (possibly artificial) leakages. The former occurs due to light scattering at impurities and density fluctuations in the optical fiber and are spread homogeneously across the whole optical fiber, while the latter may be deliberately imposed locally by an eavesdropper.

In general, it will be difficult for the eavesdropper to exploit the natural signal losses for mainly two reasons. First, the interception of such losses would generally require a large antenna covering a substantial part of the optical fiber line, which difficult to provide unnoticed, and currently available measuring devices would not cover more than about one centimeter of the optical fiber line. Second, scattering radically changes parameters such as phase and shape of transmitted wave package. Thus, in order to decipher scattered signals, the eavesdropper would need to subject the states of the intercepted photons to transformations which regarding their difficulty to being carried out may be assumed as comparable to the operation of the Maxwell demon.

Nevertheless, the risk of the eavesdropper being able to intercept and decipher natural signal losses from standard optical fibers remains.

EP 0 105 461 A2 pertains to an optical fiber comprising concentrically arranged cores that are separated by a cladding layer for trapping light and preventing crosstalk between the cores.

BRIEF SUMMARY OF THE INVENTION

In a general aspect, the present disclosure describes improved techniques for securely transmitting data via quantum key distribution, in particular for reducing the risk of successfully intercepting signals transmitted via an optical fiber.

According to one more particular aspect, a system for quantum key distribution is provided, the system comprising a first data processing device, a second data processing device, and a transmission line between the first data processing device and the second data processing device. The transmission line comprises an inner optical fiber, a shielding layer surrounding the inner optical fiber, and an outer optical fiber surrounding the shielding layer. The first data processing device and the second data processing device are configured to determine a shared key by quantum key distribution via quantum signals along the inner optical fiber. The system is configured to determine outer signal losses along the outer optical fiber.

According to another aspect, a method for quantum key distribution is provided. The method is implementable in a system which comprises a first data processing device, a second data processing device, and a transmission line between the first data processing device and the second data processing device, the transmission line comprising an inner optical fiber, a shielding layer surrounding the inner optical fiber, and an outer optical fiber surrounding the shielding layer. The method comprises determining a shared key between the first data processing device and the second data processing device by quantum key distribution via quantum signals along the inner optical fiber and determining outer signal losses along the outer optical fiber.

The claimed system and method may allow for a determining deviations and/or damages inflicted upon the outer or the inner optical fiber. As opposed to regular optical fibers, the specific design of the transmission line may substantially reduce the possibility for an undetected interception of scattering losses. In general, any local intrusion may provide an eavesdropper with only a negligible number of scattered photons. In order to intercept a sufficient amount of the scattering losses, the eavesdropper would need to breach a large section of the controlled outer optical fiber. Before such a breach could be carried out effectively, the protocol may be terminated (e.g., by the first and the second data processing device, corresponding to the legitimate users). By determining outer signal losses along the outer optical fiber, an additional layer of security may be provided. The claimed system may thus resist even a significant signal leakage fraction without the necessity of immediately terminating key exchange as soon as a channel breach event/intrusion event is detected.

BRIEF DESCRIPTION OF THE SEVERAL VIEWS OF THE DRAWING(S)

Figure 4:
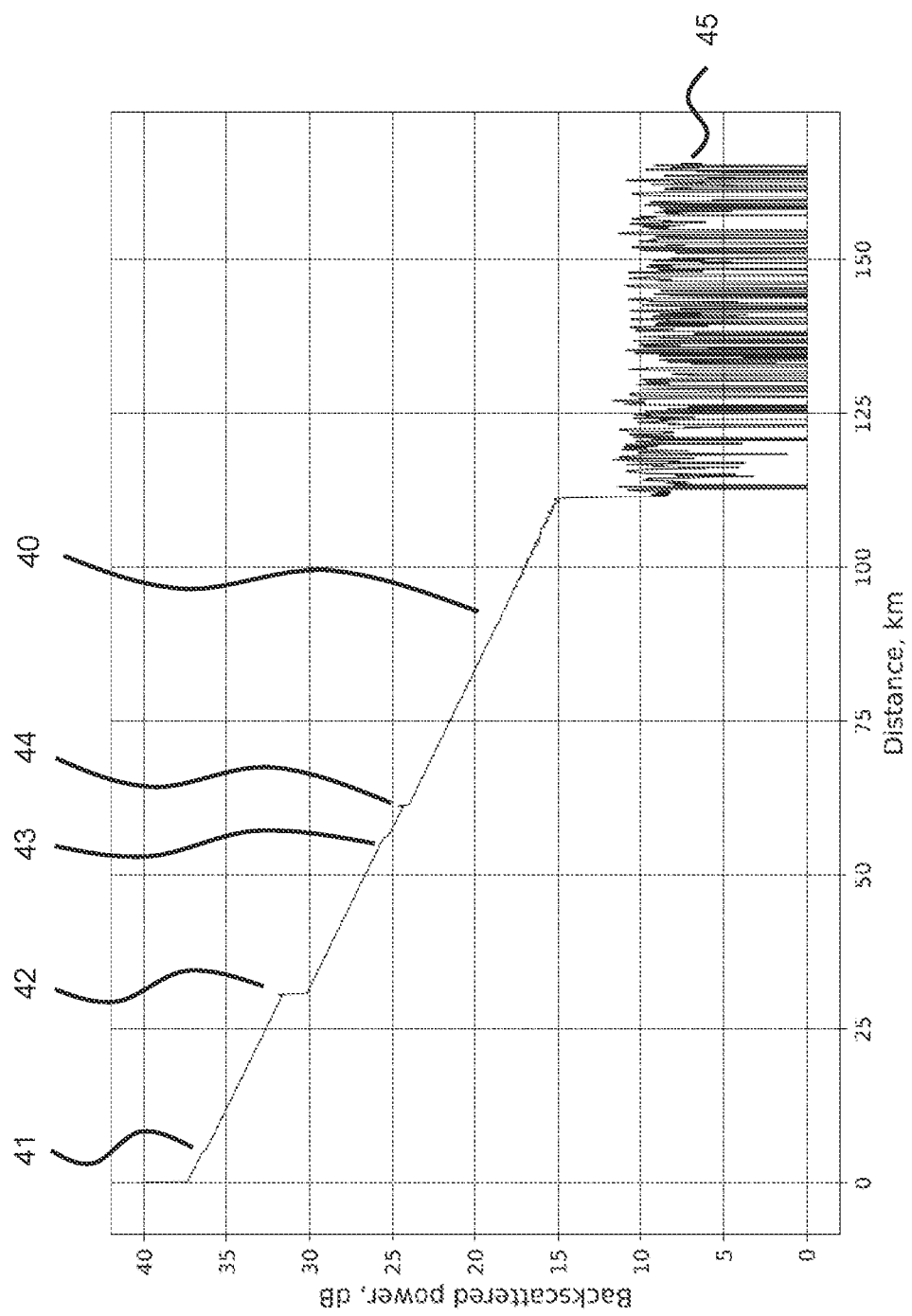
FIG. 4 is a reflectogram in accordance with the disclosure.
Figure 5B:
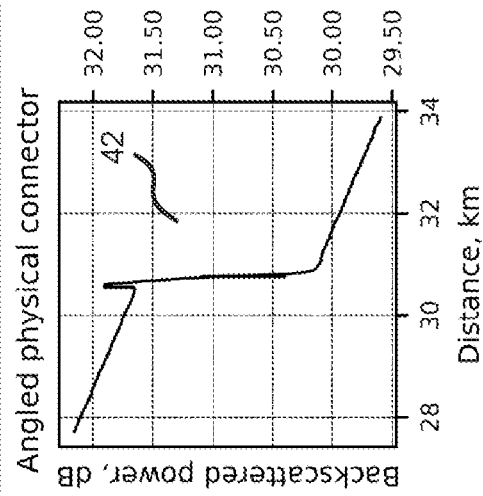
Figure 5D:
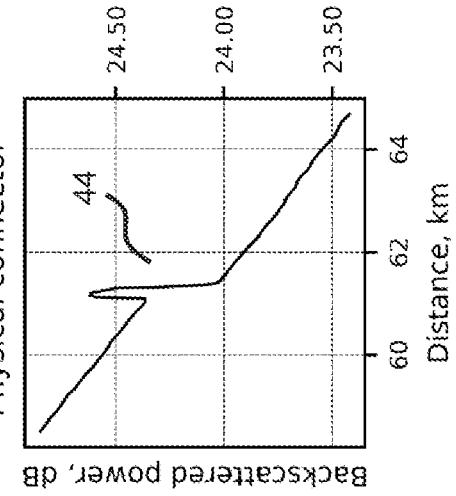
Figure 5A:
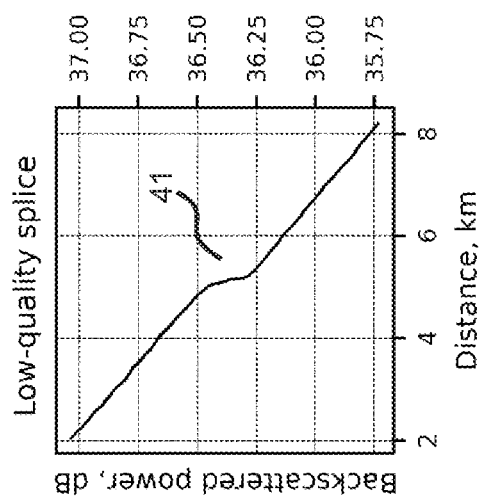
Figure 5C:
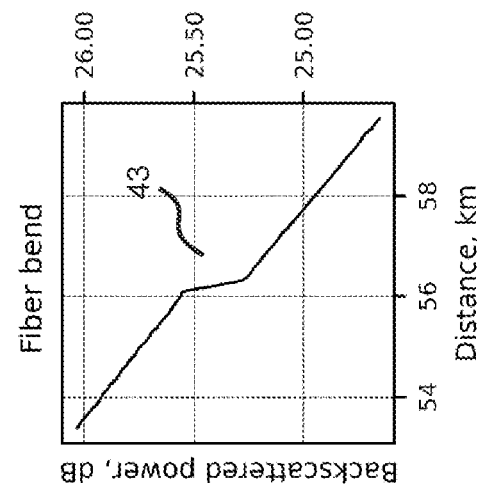

FIGS. 5a, 5b, 5c, and 5d show detail views of the reflectogram of FIG. 4.

DETAILED DESCRIPTION OF THE INVENTION

Figure 1:
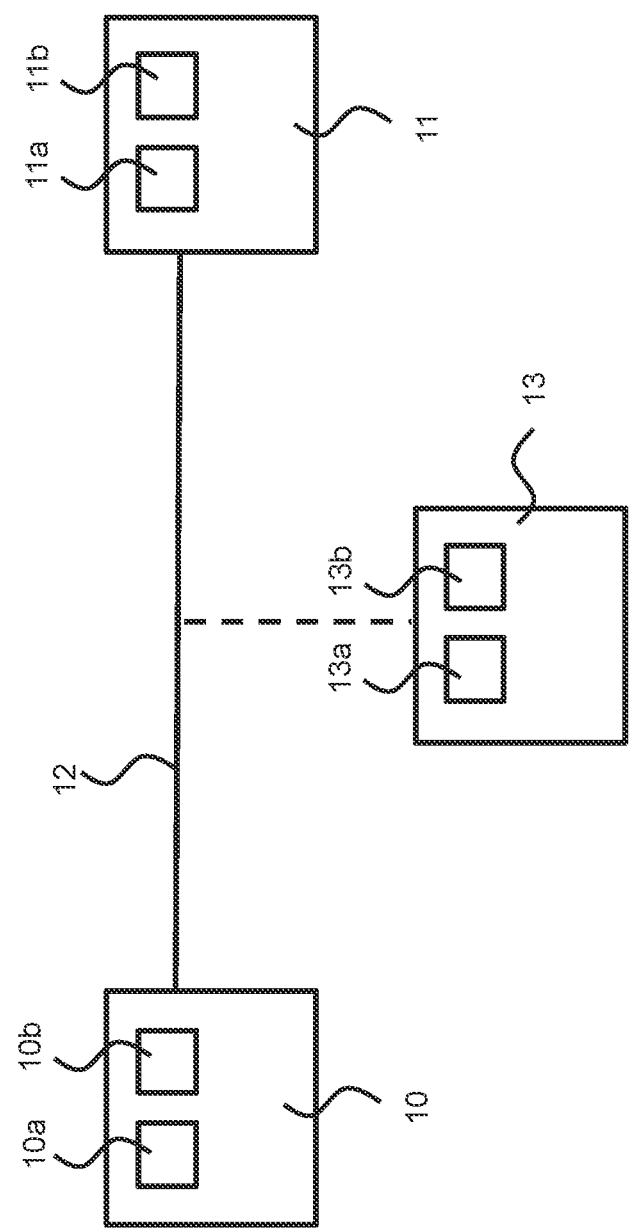
FIG. 1 is a block diagram of an arrangement of a system for quantum key distribution and an eavesdropping device, in accordance with the disclosure.

FIG. 1 shows a graphical representation of an arrangement of a system for quantum key distribution and an eavesdropping device 13 ("Eve"). The system comprises a first data processing device 10 ("Alice") and a second data processing device 11 ("Bob"). The first data processing device 10 may comprise a first processor 10a and a first memory 10b and the second data processing device 11 may comprise a second processor 11a and a second memory 11b.

The first data processing device 10 and the second data processing device 11 can exchange classical signals and/or quantum signals, for example via a transmission line 12. To this end, the first data processing device 10 and the second data processing device 11 are connected to the transmission line 12. The transmission line 12 may comprise a quantum channel configured to convey the quantum signals. Further, a classical channel configured to convey the classical signals may be provided. The classical channel may be provided within the transmission line 12 or separately. The transmission line 12 may further comprise a plurality of optical amplifiers (not shown). The optical amplifiers may be provided equidistantly along the transmission line 12, for example with an amplifier interval between 30 km and 200 km, preferably between 30 km and 100 km, more preferably between 30 km and 60 km.

The system may comprise a plurality of further data processing devices, in particular, a third data processing device with a third processor and a third memory (not shown). The third data processing device may be connected to the transmission line 12. Additionally, or alternatively, the third data processing device can exchange the classical signals and/or the quantum signals with the first data processing device 10 and/or the second data processing device 11 via further communication channels. In case the system is configured to carry out a step, such a step may be carried out in at least one of the first data processing device 10, the second data processing device 11, and the third data processing device.

The eavesdropping device 13 with an eavesdropping processor 13a and an eavesdropping memory 13b represents a device outside the system with potential access to the transmission line 12. The eavesdropping device 13 may be arranged at the transmission line 12 such that at least one or any of the classical and/or quantum signals transmitted via the transmission line 12 is received and/or retransmitted by the eavesdropping device 13. The eavesdropping device 13 may also access the further communication channels.

The first memory 10b, the second memory 11b, the third memory, and the eavesdropping memory 13b may each comprise a quantum memory that is configured to store the quantum signals and a classical memory that is configured to store the classical signals. The quantum memory may be provided using optical delay lines, controlled reversible inhomogeneous broadening (CRIB), a Duan-Lukin-Cirac-Zoller (DLCZ) scheme, revival of silenced echo (ROSE), and/or hybrid photon echo rephasing (HYPER).

The first data processing device 10, the second data processing device 11, the third data processing device, and the eavesdropping processing device 13 may each comprise means to transmit and/or to receive quantum states.

Figure 2:
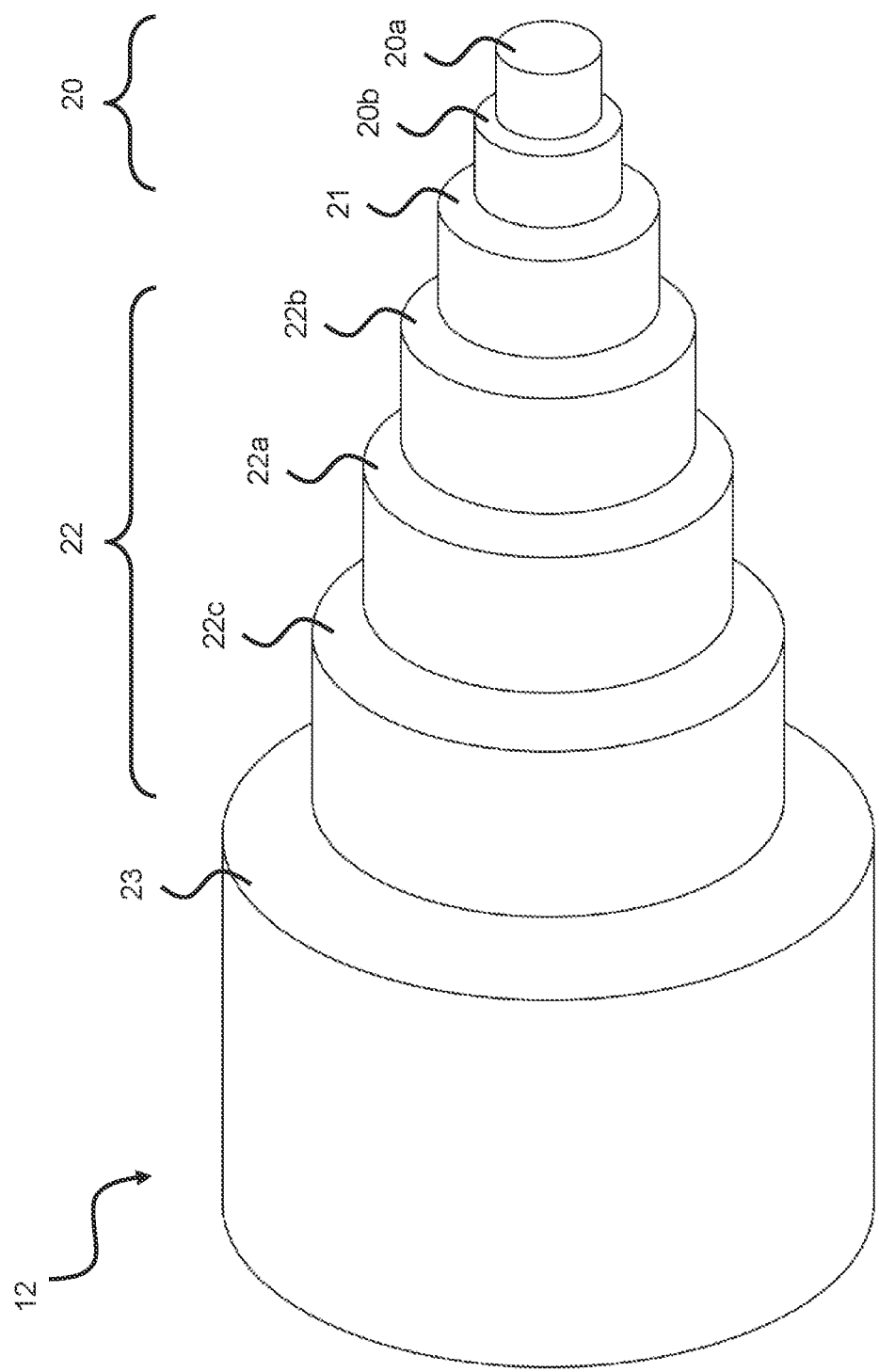
FIG. 2 is a graphical representation of segments of a transmission line, in accordance with the disclosure.

FIG. 2 shows a graphical representation of segments of the transmission line 12. The transmission line 12 comprises an inner optical fiber 20, a shielding layer 21 surrounding the inner optical fiber 20, and an outer optical fiber 22 surrounding the shielding layer 21. The outer optical fiber 20 thus represents a hollow optical fiber. Further, an outer jacket 23 (preferably including a coating layer and/or a strengthening layer may surround the outer optical fiber 22. The strengthening layer may comprise at least one of a resin layer, a polymer buffer layer, and a plastic layer. The strengthening layer may be configured to increasing an optical fiber strength and/or provide isolation from the environment.

Hence, the transmission line 12 comprises transmission line segments in the following radial ordering (from inside to outside): inner optical fiber 20, shielding layer 21, outer optical fiber 22, and outer jacket 23.

The inner optical fiber 20 comprises an inner fiber core 20a and an inner cladding layer 20b. Further, the outer optical fiber 22 comprises an outer fiber core 22a and two outer cladding layers 22b, 22c, between which the outer fiber core 22a is radially arranged. The cladding layers 20b, 22b, 22c comprise a cladding layer material with a lower refraction index than a fiber core material of the fiber cores 20a, 22a.

The transmission line 12 thus comprises transmission line segments in the following radial ordering (from inside to outside): inner fiber core 20a, inner cladding layer 20b, shielding layer 21, first outer cladding layer 22b, outer fiber core 22a, second outer cladding layer 22c, and outer jacket 23.

The transmission line 12 may additionally comprise a second shielding layer surrounding the outer optical fiber 22 and a second outer optical fiber surrounding the second shielding layer, while the outer jacket 23 surrounds the second outer optical fiber (not shown).

The shielding layer 21 can be made from a metal. Alternatively, the shielding layer 21 may be made of quartz and may additionally be heavily doped, e.g., with erbium. The shielding layer 21 thus screens the scattering losses escaping the inner optical fiber 20 since scattered optical waves undergo inelastic secondary scattering and are transformed into heat. In principle, the resulting dissipative thermal losses do not contain any information from any signals within the inner optical fiber 20 and thus cannot be deciphered.

To remove the shielding layer 21 (e.g., for intercepting scattering losses or to create an artificial leakage from the inner fiber core 20a), the eavesdropper would first need to pass the outer fiber core 22a. Such an action, however, would not go unnoticed and an intrusion event would be detected since outer signal losses along the optical fiber 22, in particular an outer (signal) loss profile of the outer optical fiber 22 and/or the outer fiber core 22a, is continuously updated (physical loss control).

Importantly, the inner fiber core 20 may also be subject to physical loss control, i.e., inner signal losses may be determined and used for intrusion detection as well. Physical loss control may allow for a quantitative estimate and a localization of any damage inflicted upon the outer fiber core 22 or the inner fiber core 20.

Figure 3:
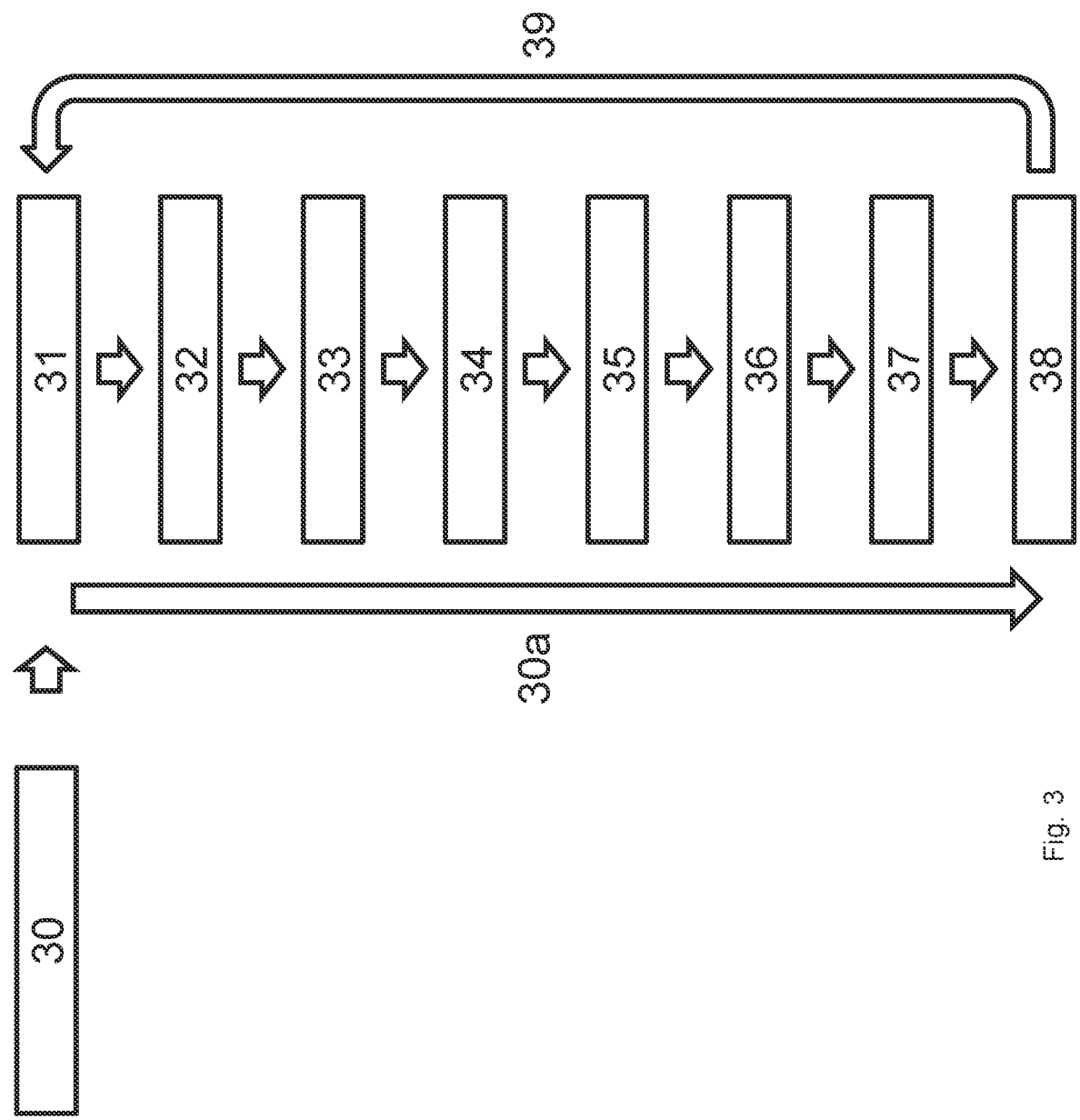
FIG. 3 is a flowchart for a method for quantum key distribution in accordance with the disclosure.

FIG. 3 shows a graphical representation of a method for quantum key distribution. The method may be implemented in the system comprising the first data processing device 10, the second data processing device 11 and the transmission line 12 in-between. The first data processing device 10 and the second data processing device 11 are connected via an authenticated (public) classical channel and the (inner) optical fiber 20 of the transmission line 12 serves as a quantum channel.

In an initial step 30, an initial inner loss profile of the inner optical fiber 20 and an initial outer signal loss profile of the outer optical fiber 22 (in particular the respective fiber cores 20a, 22a) is determined, which essentially represent the natural signal losses in the transmission line 12. At this preliminary step, it should be ensured that no eavesdropper is accessing the transmission line 12. The initial loss profile may be shared between the first and the second data processing device 10, 11 via the authenticated classical communication channel.

In a first step 31, physical loss control of the inner fiber core 20a is carried out (by the first and the second data processing device 10, 11). Notably, an inner loss profile is determined and, preferably, shared between the first and the second data processing device 10, 11 via the classical channel.

By comparing the thus updated inner loss profile with the initial inner loss profile, a fraction $r_E$ of the signal possibly seized by the eavesdropper may be determined. For example, if, in a section of the transmission line 12 not comprising optical amplifiers, the natural signal losses in this section are represented by $r_0$ and the eavesdropper intercepts an intercepted fraction $r_E$ of the signal, then the intercepted fraction $r_E$ can be derived from total losses $r_t$ via the following relation:

$$(1-r_t)=(1-r_E)(1-r_0). \quad (1)$$

When or if the intercepted fraction $r_E$ grows too large, so that the legitimate users lose their informational advantage over the eavesdropper, the protocol is terminated. Termination of the protocol depends on the length of the transmission line and the distance between two of the optical amplifiers. The protocol may in particular be terminated if an effective key rate is below a target key rate value.

In a second step 32, using a random number generator, a bit sequence of sequence length L is determined in the first data processing device 10.

In a third step 33, the bit sequence is encoded into a quantum signal comprising a series of L key signal pulses (coherent light pulses), which are transmitted to the second data processing device 11 (via the inner optical fiber 20). The signal bits 0 and 1 respectively correspond to coherent states $|\gamma_0\rangle$ and $|\gamma_1\rangle$. The particular way of encoding 0 and 1 signal bits into parameters of the coherent states $|\gamma_0\rangle$ and $|\gamma_1\rangle$ may vary. For example, the signal bits may be encoded into coherent light pulses with different intensities and same phases or, alternatively, into coherent light pulses with same intensities and different phases.

Complex amplitudes of the coherent states are optimized based on the determined fraction $r_E$ of the signal intercepted by the eavesdropper. It is therefore possible that optimized coherent states, which correspond to a maximum key generation speed for given losses in the quantum channel, are transmitted by the first data processing device 10.

In a fourth step 34, the quantum signals/coherent light pulses are amplified by a plurality of optical amplifiers provided along the transmission line 12. The optical amplifiers may be provided equidistantly along the transmission line. Each respective optical amplifier of the plurality of optical amplifiers compensates the natural signal losses up along the transmission line 12 from the preceding optical amplifier up until the respective optical amplifier. As a result, an output signal intensity at the second data processing device 11 is equal to an initial signal intensity as prepared by the first data processing device 10. Such a signal amplification does not compensate the artificial losses, which are comparatively small since an informational advantage of the legitimate users is typically ensured provided that the artificial losses constitute no more than a few percent and that otherwise the protocol is terminated.

In a fifth step 35, the quantum signals are received and measured by the second data processing device 11. A corresponding received bit sequence is determined in the second data processing device 11. It may be assumed that all determined artificial losses represent the intercepted fraction $r_E$ of the signal.

In a sixth step 36, inconclusive signal bits, which correspond to quantum measurements in the second data processing device 11 determined as inconclusive, are discarded from the bit sequence in the first data processing device 10 and the received bit sequence in the second data processing device 11. To this end, bit positions of the inconclusive signal bits are transmitted via the classical channel from the second data processing device 11 to the first data processing device 10.

In a seventh step 37, by disclosing a part of the bit sequence and/or the received bit sequence via the classical channel, an error rate may be determined, and error correction may be performed on the bit sequence and the received bit sequence by the first data processing device 10 and the second data processing device 11, respectively. The error correction maybe carried out employing, e.g., low-density parity-check (LDPC) codes. As a result, an error corrected bit sequence is determined in the first and the second data processing device 10, 11.

In an eighth step 38, an amplified key sequence is determined from the error corrected bit sequence using privacy amplification. The amplified key sequence is shorter than the error corrected bit sequence and any potential eavesdropper has none or negligibly small information on the amplified key sequence. The amplified key sequence represents a shared key sequence between the first and the second data processing device 10, 11 as a result of quantum key distribution.

The steps from the first step 31 to the eighth step 38 may be repeated (arrow 39) and the amplified key sequences concatenated to a (total) shared key until a total length of the shared key is as large as required by the application at hand.

During all steps 31 to 38, the outer optical fiber is continuously controlled, 30a. I.e., an outer signal loss profile is determined and, preferably, shared between the first and the second data processing device 10, 11 via the classical channel. In case where the integrity of the outer fiber core 22a is compromised to the extent of a considerable risk that the eavesdropper would decipher the scattering losses, i.e., if a total length of damaged transmission line segments is of order of 1 km, the protocol may be terminated.

The physical loss control of the inner fiber core 20a (step 31) may also be carried out interleaved with transmitting the quantum signals for the shared key sequences. For example, the key signal pulses (for the shared key sequences) may be transmitted alternating with test (signal) pulses for physical loss control.

The choice of encoding and measuring parameters as well as the choice of whether the protocol should be terminated are based on evaluation of the loss profile of the line, wherein the outer fiber core 22a and inner fiber core 20a are being monitored separately.

The physical loss control is based on the analysis of scattered components of the test (signal) pulses sent through the optical fibers 20, 22. The test pulses comprise a comparably high intensity.

Using optical time-domain reflectometry, backscattered test pulse components of a temporal sequence of test pulses are measured. A response delay of a backscattered test pulse component corresponds to the distance/transmission line position of a particular fiber discontinuity, while its magnitude reflects respective signal losses.

FIG. 4 shows an exemplary reflectogram resulting from optical time-domain reflectometry. The underlying measurements were carried out with a 2 µs, 1550 nm pulse laser with power less than 100 mW. The experimental data has been averaged over 16 000 measurements.

The reflectogram shows the logarithmic power of backscattered test pulse components as a function of distance between a reflectometer and the corresponding discontinuity. The reflectometer may be arranged within or close to the first data processing device 10 or the second data processing device 11.

The natural signal losses along the transmission line 12 are due to homogenous scattering and result in an exponential decay of power corresponding to linear regions 40.

Reflectogram features 41 to 44 comprising deviations from the exponential decay of the reflectogram curve, in particular sharp peaks and/or drops in the reflectogram curve allow for classifying the signal losses at the corresponding position of the transmission line 12. This is especially useful at the initial step 30, where identifying and mitigating local losses is important for comparison with determined losses during key exchange.

The reflectogram features 41 to 44 generally correspond to imperfections of the transmission line 12 and may represent low-quality splices, bends and different connectors. Scattering losses from such regions are localized with respect to the transmission line 12. Peaks in the reflectogram features 41 to 44 may result from an excessive scattering which in the case of physical connectors are due to the test pulses undergoing Fresnel reflection. Noisy region 45 at the right-hand side of the reflectogram represents the end of the backscattered signal.

FIGS. 5a-5d show detail views of the reflectogram which represent the respective reflectogram features 41 to 44. Reflectogram feature 41, shown in FIG. 5a, corresponds to a low-quality splice within the optical fiber 20, 22; reflectogram feature 42, shown in FIG. 5b, corresponds to an angled physical connector of optical fibers 20, 22; reflectogram feature 43, shown in FIG. 5c, corresponds to a bend of the optical fiber 20, 22; and reflectogram feature 44, shown in FIG. 5d, corresponds to a further physical connector.

Additionally, or alternatively, the physical loss control (transmission line control) may comprise transmittometry, i.e., intensities of the test pulses transmitted by the first data processing device 10 and received by the second data processing device 11 are analyzed for classifying the signal losses at respective positions of the transmission line 12. Classification by analyzing received test pulses in the second data processing device 11 may also be carried out in the second data processing device 11. The first data processing device 10 may also be configured to carry out classification, in particular by combining measurements of backscattered test pulse components and of test pulses received in the second data processing device 11.

Each of the inner loss profile, the outer signal loss profile, the initial inner loss profile, and the initial outer signal loss profile may comprise a respective reflectogram and/or transmittogram.

To discriminate between intrinsic signal losses and artificial signal losses, the initial inner/outer signal loss profiles are used as a reference. To provide an irreproducible profile, i.e., a physically unclonable structure of the transmission line 12, the fiber cores 20a, 22a may be slightly doped, e.g., with Al, P, N or Ge. The most general eavesdropping attack corresponds to a unitary transformation of the quantum state of a combined system comprising the propagating signal and an ancillary system. However, the only way to redirect photons is to introduce significant alterations to the optical fiber medium, which would inevitably result in changes from the (initial) reflectogram and would hence be detectable.

Preferably, the physical loss control is conducted continuously and not halted even during the pauses in the quantum key distribution. For example, a test pulse length from 10 ns to 50 ms is expected to make any real-time mechanical interference into the line immediately detectable.

For example, a separation time between test pulses may be less than 10 ms, in particular, less than one of 1 ms, 100 µs, and 10 µs. The separation time between test pulses may be less than a roundtrip time for each test pulse through the transmission line, in particular through the optical fibers and optical connections.

If an outer signal loss deviation of the outer fiber core 22a is determined at the same transmission line position at which an inner loss deviation of the inner fiber core 20a is determined, an intrusion event is determined. In this case, the losses may be assumed to be intercepted by the eavesdropper. Such inner/outer signal loss deviations may have been classified as splices or fiber bends.

In case of a transmission line length of 20,000 km, effective signal transmission requires light amplification. The precision of physical loss control is however not impeded by employing optical amplifiers for the following reasons. Rather, test pulses may be prevented from fading out analogously to key signal pulses for quantum key distribution.

If optical amplifiers are arranged equidistantly along the transmission line 12 with an amplifier distance between two respective optical amplifiers at d=50 km, light intensity drops by a factor of about 10 (corresponding to a transmission probability of T=0.1). The required amplification factor of a single amplifier is thus G=10.

If the test pulses, when being transmitted from the first data processing device 10, comprise an initial photon number $n_T^A = 10^{14}$ photons, the photon number at transmission line position 50 km is decreased to $T \cdot n_T^A = 0.1 \cdot 10^{14} = 10^{13}$. The optical amplifier at 50 km restores the photon number to $G \cdot T \cdot n_T^A = 10 \cdot 0.1 \cdot 10^{14} = 10^{14}$, but adds noise. Since photons follow Poisson statistics, fluctuations before the amplifier are $\sqrt{T \cdot n_T^A} \simeq 3 \cdot 10^6$. The fluctuations are amplified with amplification factor G as well, yielding $\delta n_T^G \simeq G \sqrt{T \cdot n_T^A} \simeq 3 \cdot 10^7$.

Passing a sequence of M amplifiers, each of which independently adds further fluctuations, the total fluctuations are increased by a factor of $\sqrt{M}$, resulting in twenty-fold fluctuation increase for 400 amplifiers for a transmission line length of 20 000 km. The fluctuations at the second data processing device 11 are thus $\delta n_T^B \simeq \sqrt{M} \delta n_T^G \simeq 6 \cdot 10^8$. This corresponds to a ratio of $\delta n_T^B / n_T^B \sim 10^{-5}$. Correspondingly, the minimum detectable leakage is $r_E^{min} \sim 10^{-5}$.

The features disclosed in this specification, the figures and/or the claims may be material for the realization of various embodiments, taken in isolation or in various combinations thereof.

Within the context of the present disclosure, a layer surrounding a fiber is to be understood as the inner lateral surface of the layer surrounding the outer lateral surface of the fiber (along a radial/lateral direction). Correspondingly, a fiber surrounding a layer is to be understood as the inner lateral surface of the fiber surrounding the outer lateral surface of the layer. The surrounding may comprise a surrounding along the entire circumference of the lateral surface.

The inner optical fiber may be in physical contact with the shielding layer. The shielding layer may be in physical contact with the inner optical fiber and/or the outer optical fiber. The outer optical fiber may be in physical contact with the outer jacket. In particular, the outer lateral surface of the inner optical fiber may be in physical contact with the inner lateral surface of the shielding layer, preferably along its entire circumference. The outer lateral surface of the shielding layer may be in physical contact inner lateral surface of the outer optical fiber, preferably along its entire circumference. The outer lateral surface of the outer optical fiber may be in physical contact with the inner lateral surface of the outer jacket, preferably along its entire circumference.

The inner optical fiber may comprise an inner fiber core and, preferably, an inner cladding layer. The inner fiber core and the inner cladding layer may be in physical contact. The outer optical fiber may comprise an outer fiber core and, preferably, two outer cladding layers. The outer fiber core may be in physical contact with the outer cladding layers. The outer optical fiber may surround a first outer cladding layer. A second outer cladding layer may surround the outer optical fiber.

The cladding layers may each comprise a cladding layer material with a lower refraction index than each fiber core material of the fiber cores. The fiber core material and/or the cladding layer material may, e.g., be silica.

It may be provided that no quantum key distribution is carried out via the outer optical fiber. In other words, it may be provided that the shared key is determined only via the inner optical fiber. In this case, the outer optical fiber may only serve for determining (outer) signal losses and/or intrusion events.

The transmission line may comprise an optical amplifier, preferably an Erbium-doped fiber amplifier or a Raman amplifier. The transmission line may comprise a plurality of optical amplifiers. It may be provided that an amplifier distance between two adjacent amplifiers is between 30 km and 200 km, preferably between 30 km and 60 km. The plurality of optical amplifiers may be arranged equidistantly along the transmission line.

In case the system is configured to carry out a step/determine a quantity, such a step may be carried out/such a quantity may be determined in at least one of the first data processing device, the second data processing device, and a third data processing device.

The inner optical fiber and the outer optical fiber may be arranged concentrically. Preferably, the inner optical fiber, the shielding layer, and the outer optical fiber may be arranged concentrically. In particular, at least two of, preferably each of the inner fiber core, the inner cladding layer, the shielding layer, the first outer cladding layer, the outer fiber core, the second outer cladding layer, and the outer jacket may be arranged concentrically.

The shielding layer may be configured to laterally screen signals within the inner optical fiber. In other words, the shielding layer may be configured to prevent the signals along the inner optical fiber to escape laterally.

In particular, the shielding layer may be made of a metal. The metal may for example be one of copper, aluminum, copper, gold, nickel, silver, bronze, and nichrome.

In general, the shielding layer may comprise or be made of an electrically conductive material.

Alternatively, the shielding layer may be made of quartz and/or comprise a shielding layer dopant material with a concentration from 1015 cm-3 to 1018 cm-3 or from 0.75 ppm to 75 ppm. The shielding layer dopant material may be one of erbium (Er), neodymium (Nd), europium (Eu), terbium (Tb), ytterbium (Yb), and Thulium (Tm). The shielding layer dopant material concentration may be essentially constant along the length of the transmission line and/or the circumference of the shielding layer. The shielding layer dopant material concentration may also vary along the length of the transmission line and/or the circumference of the shielding layer.

The shielding layer may comprise a shielding layer thickness between 10% and 300%, preferably between 25% and 200%, more preferably between 50% and 100% of an outer optical fiber thickness. An inner fiber core thickness and/or an outer fiber core thickness may be between 5 μm and 10 μm. An inner cladding thickness and/or an outer cladding thickness may be between 100 μm and 250 μm. The shielding layer thickness may be essentially constant along the length of the transmission line and/or the circumference of the shielding layer.

The inner optical fiber and/or the outer optical fiber may comprise an optical fiber dopant material with a concentration from 1012 cm-3 to 1014 cm-3. The inner optical fiber (in particular, the inner fiber core) may comprise an inner optical fiber dopant material with a concentration from 1012 cm-3 to 1014 cm-3. Further, the outer optical fiber (in particular, the outer fiber core) may comprise an outer optical fiber dopant material with a concentration from 1012 cm-3 to 1014 cm-3. The inner optical fiber dopant material and the outer optical fiber dopant material may be different.

The (inner and/or outer) optical fiber dopant material may be one of Al, P, N, and Ge. An (inner and/or outer) optical fiber dopant material concentration may be essentially constant along the length of the transmission line and/or the circumference of the (inner/outer) optical fiber. The (inner and/or outer) optical fiber dopant material concentration may also vary along the length of the transmission line and/or the circumference of the (inner/outer) optical fiber.

The inner optical fiber and/or the outer optical fiber may also be free from an optical fiber dopant material.

The system may be configured to determine the outer signal losses depending on a position within the transmission line. In other words, the outer signal losses may be determined as a function of the position along the transmission line. In particular, for each position along the transmission line, corresponding outer signal losses may be determined. The outer signal losses may thus correspond to an (outer) signal loss profile.

The system may be configured to determine inner signal losses along the inner optical fiber and, preferably, to determine the intrusion event additionally based on the inner losses. The inner signal losses may be determined depending on the position within the transmission line.

The inner signal losses and/or the outer signal losses may be determined by at least one of the first data processing device, the second data processing device, and the third data processing device.

The system may be configured to repeatedly determine the outer signal losses and/or the inner signal losses. For example, the outer signal losses and/or the inner signal losses may be repeatedly determined within a time interval from 1 ms to 50 s, preferably from 20 ms to 10 s, in particular from one of 10 ms to 100 ms, 50 ms to 500 ms, 100 ms to 1000 ms, 0.5 s to 5 s, and 5 s to 10 s. The time interval may be dependent on the length of the transmission line. The time interval may increase with the length of the transmission line.

The system may be configured to determine the outer signal losses and/or the inner signal losses during determining of the shared key. The outer signal losses and/or the inner signal losses may in particular be determined during/in temporal connection with the transmission of key signal pulses for determining the shared key.

The outer signal losses and/or inner signal losses may additionally be determined subsequent to determining the shared key.

The system may be configured to determine initial outer signal losses along the outer optical fiber and/or to determine initial inner signal losses along the inner optical fiber.

The initial outer signal losses and/or the initial inner signal losses may be determined before determining the shared key, in particular before transmitting the key signal pulses for determining the shared key.

The first data processing device and/or the second data processing device may be configured to transmit a plurality of test signals via the transmission line, preferably via the inner optical fiber and/or via the outer optical fiber; and to determine the outer signal losses and/or the inner signal losses from backscattered test signal components of the plurality of test signals.

In particular, the first data processing device and/or the second data processing device may be configured to transmit a plurality of inner test signals via the inner optical fiber and to determine the inner signal losses from backscattered inner test signal components of the plurality of inner test signals. Further, the first data processing device and/or the second data processing device may be configured to transmit a plurality of outer test signals via the outer optical fiber and to determine the outer signal losses from backscattered outer test signal components of the plurality of outer test signals.

The (inner and/or outer) test signals may, e.g., be test pulses, in particular coherent light pulses. An average test pulse intensity of the test pulses may be greater than an average key signal pulse intensity of the key signal pulses, for example, by a factor of between 103 and 1010, preferably between 105 and 108. Each of the key signal pulse may comprise between 102 and 105 photons. Each of the test pulse may comprise between 108 and 1012 photons.

The first data processing device and/or the second data processing device may be configured to receive the backscattered test signal components, in particular the backscattered inner test signal components and/or the backscattered outer test signal components.

The outer test pulses may be transmitted before and/or during and/or subsequent to transmitting the key signal pulses. The inner test pulses may be transmitted before and/or alternating with and/or subsequent to transmitting the key signal pulses.

The inner signal losses and/or the outer signal losses may be determined by optical time-domain reflectometry. The outer signal losses may comprise an (outer optical fiber) reflectogram. The inner signal losses may comprise an inner optical fiber reflectogram.

Additionally, or alternatively to being configured to determine the inner/outer signal losses from backscattered test pulse components, the system may also be configured to determine the outer signal losses and/or inner signal losses from transmitted components of the plurality of test pulses.

In particular, the system may be configured to determine the outer signal losses from transmitted outer test signal components of the plurality of test pulses. The system may also be configured to determine the inner signal losses from transmitted inner test signal components of the plurality of test pulses.

The inner signal losses and/or the outer signal losses may be determined by transmittometry, i.e., by determining inner/outer signal losses from transmitted signal pulses and/or test pulses. In particular, the inner signal losses and/or outer signal losses may be determined by comparing input intensities with output intensities of test pulses transmitted through the entire transmission line.

The system may be configured to determine an intrusion event based on the outer signal losses and/or to abort (terminate) determining of the shared key based on the outer signal losses. Additionally, or alternatively, the system may be configured to determine the intrusion event based on the inner losses and/or to abort the determining of the shared key based on the inner signal losses.

The system may be configured to discard the shared key based on the inner and/or outer signal losses.

Determining the intrusion event may comprise classifying the inner signal losses and/or the outer signal losses (depending on the transmission line position) according to a signal loss type (depending on the transmission line position). The signal loss type may be at least one of a deviation of an exponential decay of power, a low-quality splice, a physical connector, an angled physical connector, and a fiber bend. The classifying may, e.g., be carried out via a machine learning method, for example an artificial neural network. The classifying may be carried out in at least one of the first, second, and third data processing device. The inner signal losses and/or the outer signal losses may correspond to reflectogram features and/or transmittogram features from transmittometry.

Determining the intrusion event may further comprise determining a signal loss type length indicative of a length of the signal loss type along the transmission line. Determining the intrusion event may be based on the signal loss type and, preferably, the signal loss type length being above a threshold value. The threshold value may, e.g., be between 1 m and 10 km, preferably between 100 m and 2 km, more preferably between 0.5 km and 1.5 km.

Determining the intrusion event may thus be based on the signal loss type and/or the signal loss type length.

Determining the intrusion event may further comprise determining an initial signal loss type and, preferably, an initial signal loss type length indicative of a length of the initial signal loss type along the transmission line. Determining the intrusion event may additionally be based on a determined discrepancy between signal loss type and initial signal loss type (and/or between signal loss type length and initial signal loss type length) at a transmission line position/region.

The system may be configured to determine a severity index of the intrusion event. Determining the severity index may comprise determining a magnitude of and/or a probability for information leakage.

It may be provided that determining of the shared key is aborted in reaction to determining the intrusion event, in particular, the severity index of the intrusion event.

The protocol may be terminated based on having determined that a total amount of losses (comprising natural scattering losses and local leakages) from the inner fiber core has exceeded a predetermined limit. The predetermined limit may depend on one of a target key distribution rate, the length of the transmission line, a distance between two optical amplifiers, a number of optical amplifiers, and an optical amplifier amplification factor.

The transmission line may comprise a second shielding layer surrounding the outer optical fiber and a second outer optical fiber surrounding the second shielding layer.

The properties regarding the shielding layer and outer optical fiber may apply mutatis mutandis to the second shielding layer and/or the second outer optical fiber. The inner optical fiber, the shielding layer, and the outer optical fiber, the second shielding layer, and the second outer optical layer may be arranged concentrically. The system may be configured to determine second outer signal losses along the second outer optical fiber. Determining the intrusion event may (additionally or alternatively) be based on the second outer signal losses.

It may be provided that no quantum key distribution is carried out via the second outer optical fiber. In other words, it may be provided that the shared key is determined only via the inner optical fiber and the (first) outer optical fiber.

Alternatively, it may be provided that no quantum key distribution is carried out via the (first) outer optical fiber and the second outer optical fiber. In other words, it may be provided that the shared key is determined only via the inner optical fiber.

Such a design may, in case of quantum key distribution using the inner optical fiber and the (first) outer optical fiber, allow for an increased key distribution rate while retaining increased security with respect to eavesdropping. If only the inner optical fiber is used for quantum key distribution, security is increased even further.

The transmission line may also comprise a plurality of second shielding layers and a plurality of second outer optical fibers alternatingly arranged around the outer optical fiber.

The aforementioned embodiments related to the system for quantum key distribution can be provided correspondingly for the method for quantum key distribution and vice versa.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for quantum key distribution, comprising:
   a first data processing device;
   a second data processing device; and
   a transmission line extending between the first data processing device and the second data processing device, the transmission line comprising:
   an inner optical fiber,
   a shielding layer surrounding the inner optical fiber, and
   an outer optical fiber surrounding the shielding layer;
   wherein the first data processing device and the second data processing device are configured to determine a shared key by quantum key distribution via quantum signals along the inner optical fiber; and
   wherein the system is configured to determine outer signal losses along the outer optical fiber.

2. The system according to claim 1, wherein the inner optical fiber, the shielding layer, and the outer optical fiber are arranged concentrically.

3. The system according to claim 1, wherein the shielding layer is configured to laterally screen signals within the inner optical fiber.

4. The system according to claim 1, wherein the shielding layer is made of a metal.

5. The system according to claim 1, wherein the shielding layer comprises a shielding layer dopant material with a concentration from $10^{15}$ cm$^{-3}$ to $10^{18}$ cm$^{-3}$.

6. The system according to claim 1, wherein the inner optical fiber and/or the outer optical fiber comprises an optical fiber dopant material with a concentration from $10^{12}$ cm$^{-3}$ to $10^{14}$ cm$^{-3}$.

7. The system according to claim 1, wherein the system is configured to determine the outer signal losses depending on a position within the transmission line.

8. The system according to claim 1, wherein the system is configured to determine inner signal losses along the inner optical fiber.

9. The system according to claim 1, wherein the system is configured to determine an intrusion event based on the inner losses.

10. The system according to claim 1, wherein the system is configured to repeatedly determine outer signal losses.

11. The system according to claim 1, wherein the system is configured to determine outer signal losses during determining of the shared key.

12. The system according to claim 1, wherein the system is configured to determine initial outer signal losses along the outer optical fiber and/or determine initial inner signal losses along the inner optical fiber.

13. The system according to claim 1, wherein the first data processing device and/or the second data processing device is configured to transmit a plurality of test signals via the transmission line and determine outer signal losses from backscattered test signal components of the plurality of test signals.

14. The system according to claim 13, wherein the system is configured to additionally determine the outer signal losses from transmitted components of the plurality of test pulses.

15. The system according to claim 1, wherein the system is configured to determine an intrusion event based on the outer signal losses and/or to abort the determining of the shared key based on the outer signal losses.

16. The system according to claim 1, wherein the transmission line comprises a second shielding layer surrounding the outer optical fiber and a second outer optical fiber surrounding the second shielding layer.

17. A method for quantum key distribution, the method being implementable in a system, the system comprising:
   a first data processing device;
   a second data processing device; and
   a transmission line extending between the first data processing device and the second data processing device, the transmission line comprising:
      an inner optical fiber,
      a shielding layer surrounding the inner optical fiber, and
      an outer optical fiber surrounding the shielding layer;
   the method comprising:
   determining a shared key between the first data processing device and the second data processing device by quantum key distribution via quantum signals along the inner optical fiber; and
   determining outer signal losses along the outer optical fiber.

* * * * *